United States Patent
Lee

(10) Patent No.: US 8,852,791 B2
(45) Date of Patent: *Oct. 7, 2014

(54) POUCH TYPE LITHIUM SECONDARY BATTERY WITH SLEEVE AND METHOD OF FABRICATING

(75) Inventor: Hyung Bok Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 881 days.

This patent is subject to a terminal disclaimer.

(21) Appl. No.: 11/375,351

(22) Filed: Mar. 13, 2006

(65) Prior Publication Data

US 2006/0216585 A1 Sep. 28, 2006

(30) Foreign Application Priority Data

Mar. 28, 2005 (KR) .................. 10-2005-0025542
Mar. 28, 2005 (KR) .................. 10-2005-0025543

(51) Int. Cl.
| | |
|---|---|
| H01M 2/02 | (2006.01) |
| H01M 2/00 | (2006.01) |
| H01M 2/04 | (2006.01) |
| H01M 10/0587 | (2010.01) |
| H01M 2/22 | (2006.01) |
| H01M 10/42 | (2006.01) |
| H01M 2/30 | (2006.01) |
| H01M 10/04 | (2006.01) |

(52) U.S. Cl.
CPC ............ *H01M 10/0587* (2013.01); *H01M 2/22* (2013.01); *H01M 2/0257* (2013.01); *H01M 10/425* (2013.01); *Y02E 60/12* (2013.01); *H01M 10/04* (2013.01); *H01M 2/30* (2013.01); *H01M 2/0287* (2013.01); *H01M 2/0275* (2013.01)

USPC .................. 429/163; 429/176; 429/177

(58) Field of Classification Search
USPC .......... 429/133, 136, 139, 185, 162–163, 429/175–178, 180; 29/623.2
See application file for complete search history.

(56) References Cited

U.S. PATENT DOCUMENTS

| | | | |
|---|---|---|---|
| 5,591,540 A | 1/1997 | Louie et al. | |
| 5,916,704 A | 6/1999 | Lewin et al. | |
| 6,048,638 A | 4/2000 | Pendalwar | |
| 6,296,967 B1 * | 10/2001 | Jacobs et al. | 429/93 |

(Continued)

FOREIGN PATENT DOCUMENTS

| | | |
|---|---|---|
| CN | 1298212 A | 6/2001 |
| CN | 1411081 A | 4/2003 |

(Continued)

OTHER PUBLICATIONS

Merriam-Webster's Collegiate Dictionary, 11$^{th}$ Edition, 2003, p. 410.*

(Continued)

*Primary Examiner* — Jonathan G Leong

(74) *Attorney, Agent, or Firm* — Christie, Parker & Hale, LLP

(57) ABSTRACT

A pouch type lithium secondary battery includes a pouch bare cell having an electrode assembly and a pouch exterior for storing the electrode assembly and a sleeve member winding around the pouch bare cell. A method of fabricating a pouch type lithium secondary battery includes forming a pouch bare cell by storing an electrode assembly in a pouch exterior and wrapping the pouch bare cell with a sleeve member.

4 Claims, 8 Drawing Sheets

(56) References Cited

U.S. PATENT DOCUMENTS

| | | | |
|---|---|---|---|
| 6,461,757 | B1 | 10/2002 | Sasayama et al. |
| 6,468,690 | B1 | 10/2002 | Barker et al. |
| 6,515,449 | B1 | 2/2003 | Thomas et al. |
| 6,524,732 | B1 | 2/2003 | Iwaizono et al. |
| 6,676,714 | B2 | 1/2004 | Langan |
| 6,844,105 | B1* | 1/2005 | Hanafusa et al. ............... 429/62 |
| 6,902,844 | B2 | 6/2005 | Yageta et al. |
| 2001/0033962 | A1 | 10/2001 | Suzuki |
| 2002/0022180 | A1 | 2/2002 | Olsen et al. |
| 2002/0106555 | A1 | 8/2002 | Langan |
| 2003/0082445 | A1 | 5/2003 | Smith et al. |
| 2003/0165736 | A1 | 9/2003 | Hiratsuka |
| 2003/0173709 | A1* | 9/2003 | Iwaizono et al. ........ 264/272.17 |
| 2003/0180582 | A1 | 9/2003 | Masumoto et al. |
| 2004/0029001 | A1* | 2/2004 | Yamazaki et al. ............ 429/176 |
| 2004/0115527 | A1* | 6/2004 | Hiratsuka et al. ............ 429/176 |
| 2004/0149375 | A1 | 8/2004 | Huang et al. |
| 2005/0014036 | A1 | 1/2005 | Kim |
| 2005/0151514 | A1 | 7/2005 | Kozu et al. |
| 2005/0175889 | A1 | 8/2005 | Han |
| 2005/0282069 | A1* | 12/2005 | Kim et al. ..................... 429/185 |
| 2006/0099503 | A1* | 5/2006 | Lee ............................... 429/176 |
| 2006/0214632 | A1* | 9/2006 | Lee et al. ...................... 320/112 |

FOREIGN PATENT DOCUMENTS

| | | |
|---|---|---|
| CN | 1574415 A | 2/2005 |
| EP | 1 107 336 A2 | 6/2001 |
| EP | 1 111 696 A2 | 6/2001 |
| EP | 1 403 942 A1 | 3/2004 |
| EP | 1 473 785 A2 | 11/2004 |
| JP | 2000-294207 | 10/2000 |
| JP | 2001-176471 | 6/2001 |
| JP | 2002-100326 | 4/2002 |
| JP | 2002-134077 | 5/2002 |
| JP | 2002-208767 | 7/2002 |
| JP | 2002-298828 | 10/2002 |
| JP | 2002-343905 | 11/2002 |
| JP | 2003-282039 | 10/2003 |
| JP | 2003-303580 | 10/2003 |
| JP | 2004-047334 | 2/2004 |
| JP | 2004-087219 | 3/2004 |
| JP | 2005-079080 | 3/2005 |
| KR | 10-2000-0073090 | 12/2000 |
| KR | 10-0346378 B1 | 7/2002 |
| KR | 2003-67517 | 8/2003 |
| KR | 2003-96718 | 12/2003 |
| KR | 10-2004-0014990 | 2/2004 |
| KR | 10-2004-0027365 | 4/2004 |
| KR | 10-2005-0022853 | 3/2005 |
| KR | 10-2005-0088007 | 9/2005 |
| WO | WO 03/081695 A1 | 10/2003 |

OTHER PUBLICATIONS

Machine Translation of KR 10 2001 0046921 originally published to Jang et al. in Jun. 2001.*
Koren Patent Abstracts, Publication No. 1020030067517 A, dated Aug. 14, 2003, in the name of Masaru Hiratsuka.
Koren Patent Abstracts, Publication No. 1020030096718 A, dated Dec. 31, 2003, in the name of Yun Han Jang et al.
U.S. Office action dated Dec. 12, 2008, for related U.S. Appl. No. 11/362,559.
U.S. Office action dated Dec. 30, 2008, for related U.S. Appl. No. 11/540,855.
U.S. Office action dated Jun. 19, 2009, for related U.S. Appl. No. 11/540,855.
Dictionary.com, LLC; http://dictionary.reference.com/browse/around; (2009), 5 pages.
SIPO Office action dated Jan. 4, 2008, for Chinese Patent application 200610067992.5.
European Search Report dated Sep. 26, 2007, for European Patent application 06120961.5.
U.S. Office action dated Sep. 16, 2009, for related U.S. Appl. No. 11/374,857.
Korean Patent Abstracts, Publication No. 1020050088007, dated Sep. 1, 2005, in th ename of Hyung Woo Jeon.
English machine translation for Japanese Publication 2004-087219.
Korean Patent Abstracts, Publication No. 10-2001-0046921, dated Jun. 15, 2001 corresponding to Korean Patent 10-0346378.
SIPO Office action dated Dec. 28, 2007, for Chinese Patent application 200610071476.X.
Japanese Office action dated Sep. 1, 2009, for Japanese Patent application 2006-061901.
U.S. Office action dated Aug. 31, 2010, for cross reference U.S. Appl. No. 11/374,857.
U.S. Office action dated Jun. 10, 2009, for cross-reference U.S. Appl. No. 11/362,559, 24 pages.
U.S. Notice of Allowance dated Nov. 6, 2009, for cross-reference U.S. Appl. No. 11/362,559, 8 pages.
U.S. Office action dated Nov. 20, 2009, cross-reference U.S. Appl. No. 11/540,855, 11 pages.
U.S. Notice of Allowance dated Feb. 19, 2010, for cross-reference U.S. Appl. No. 11/540,855, 7 pages.
U.S. Notice of Allowance dated Jun. 4, 2010, for cross-reference U.S. Appl. No. 11/540,855, 7 pages.
U.S. Notice of Allowance dated Aug. 6, 2010, cross-reference U.S. Appl. No. 11/540,855, 10 pages.
U.S. Office action dated Feb. 9, 2011, or cross-reference U.S. Appl. No. 11/374,857, 8 pages.
U.S. Notice of Allowance dated Feb. 15, 2011, for cross-reference U.S. Appl. No. 11/540,855, 8 pages.
U.S. Notice of Allowance dated Jul. 11, 2011, for cross-reference U.S. Appl. No. 11/374,857, 5 pages.
Japanese Office action dated Nov. 29, 2011, for corresponding Japanese Patent application 2006-82653, 9 pages.
U.S. Office action dated Dec. 20, 2011, for cross reference U.S. Appl. No. 13/244,432, 10 pages.
U.S. Notice of Allowance dated Dec. 22, 2011 for cross reference U.S. Appl. No. 11/374,857, 7 pages.
U.S. Notice of Allowance dated Mar. 14, 2012, for U.S. cross reference U.S. Appl. No. 11/374,857, (7 pages).
U.S. Office action dated Aug. 6, 2012, for cross reference U.S. Appl. No. 13/244,432, (16 pages).
U.S. Notice of Allowance dated Nov. 2, 2012, for cross reference U.S. Appl. No. 13/244,432, (5 pages).

* cited by examiner

POUCH TYPE LITHIUM SECONDARY BATTERY WITH SLEEVE AND METHOD OF FABRICATING

CROSS-REFERENCE TO RELATED APPLICATIONS

This application claims priority to and the benefit of Korean Patent Application Nos. 10-2005-0025542, filed on Mar. 28, 2005 and 10-2005-0025543, filed on Mar. 28, 2005, in the Korean Intellectual Property Office, the entire contents of which are incorporated herein by reference.

BACKGROUND OF THE INVENTION

1. Field of the Invention

The present invention relates to a lithium secondary battery and a method of fabricating the same, and more particularly, to a pouch type lithium secondary battery and a method of fabricating the same having a simplified packing process.

2. Description of Related Art

Typically, in a lithium secondary battery, a lithium based oxide is used as a positive active material, and a carbon based material is used as a negative active material. The lithium secondary battery can be classified into a liquid electrolyte battery and a polymer electrolyte battery depending on a type of the electrolyte. The liquid electrolyte battery is often referred to as a lithium ion battery, and the polymer electrolyte battery is often referred to as a lithium polymer battery. In addition, the lithium ion battery is fabricated in various shapes such as a roll type, a polygonal type, and a pouch type.

Among them, the pouch type lithium secondary battery has a pouch exterior including a metallic foil and a multi-layered synthetic resin film covering the metallic foil layer. The pouch type has been increasingly used and developed as a light-weight lithium secondary battery because it is possible to significantly reduce the weight of the battery in comparison with a polygonal type or a roll type which utilizes a heavier metallic can.

A conventional method of fabricating the pouch type lithium secondary battery will now be briefly described. First, an electrode assembly is arranged on a second side of a pouch exterior having a space for receiving an electrode assembly. Then, the second side is covered with a first side of the pouch exterior, and the pouch exterior is sealed, so that a pouch bare cell is obtained. Subsequently, accessories such as a protection circuit module are attached to the pouch bare cell to provide a pouch core pack, and the pouch core pack is inserted into a battery pack case, so that a pouch type lithium secondary battery can be finally provided.

However, according to a conventional method of fabricating a pouch type lithium secondary battery, a separate battery pack case should be used. Therefore, the fabrication process takes a relatively long time. This fact has limited a manufacturing yield of the pouch type lithium secondary battery.

In addition, a separate battery pack case has limited cost reduction of the pouch type lithium secondary battery.

SUMMARY OF THE INVENTION

Various embodiments of the present provide a pouch type lithium secondary battery and a method of fabricating the same having a simplified packing process.

One embodiment of a pouch type lithium secondary battery according to the invention includes a pouch bare cell having an electrode assembly and a pouch exterior for storing the electrode assembly; and a sleeve member winding around the pouch bare cell. In one embodiment, the sleeve member is a metallic foil made of aluminum or steel-use stainless (SUS).

The battery may further include a protection circuit module for controlling charge/discharge and error operations in the electrode assembly, wherein the protection circuit module is electrically connected to the electrode assembly at a first end of the pouch bare cell and has an input/output terminal for charging/discharging the electrode assembly on a first surface of the protection circuit module.

A first molding unit may also be provided on a first portion of the pouch exterior for covering the first surface of the protection circuit module while exposing the input/output terminal provided on the first surface of the protection circuit module. A second molding unit may also be provided on a second portion of the pouch exterior. The first molding unit may be formed by a hot-melt resin, such as a thermal type adhesive. The hot-melt resin may include a material selected from a group consisting of an ethylene-vinyl acetate copolymer based material, a polyester based material, a rubber based material, and a polyurethane based material.

The battery may also include first and second insulation plates respectively located at first and second portions of the electrode assembly, and the pouch exterior may include a core layer; a thermoplastic layer formed on the core layer; and an insulation film formed beneath the core layer. The core layer may include aluminum; the thermoplastic layer may include modified polypropylene; and the insulation film includes nylon or polyethylene terephthalate (PET).

A reinforcing member may be provided on at least a part of an outer surface of the pouch bare cell, and may be located on the outer surface of the pouch bare cell such that, when the pouch type lithium secondary battery is installed in an electric/electronic device, the reinforcing member would face an outer part of the electric/electronic device. The reinforcing member may be a plate made of metal or plastic.

One embodiment of a method of fabricating a pouch type lithium secondary battery includes forming a pouch bare cell by storing an electrode assembly in a pouch exterior; and wrapping the pouch bare cell with a sleeve member. The embodiment may also include connecting a protection circuit module having an input/output terminal on a first surface of the protection circuit module to the electrode assembly at one end of the pouch bare cell and forming a first molding unit on a first side of the pouch bare cell by hot-melting the sleeve member, wherein the first molding unit covers the protection circuit module while exposing an input/output terminal formed on the protection circuit module.

Another embodiment also includes forming a first molding unit on the sleeve member by hot-melting the sleeve member and attaching a reinforcing member on at least a part of an outer surface of the pouch bare cell after forming the pouch bare cell.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Figure 1A:
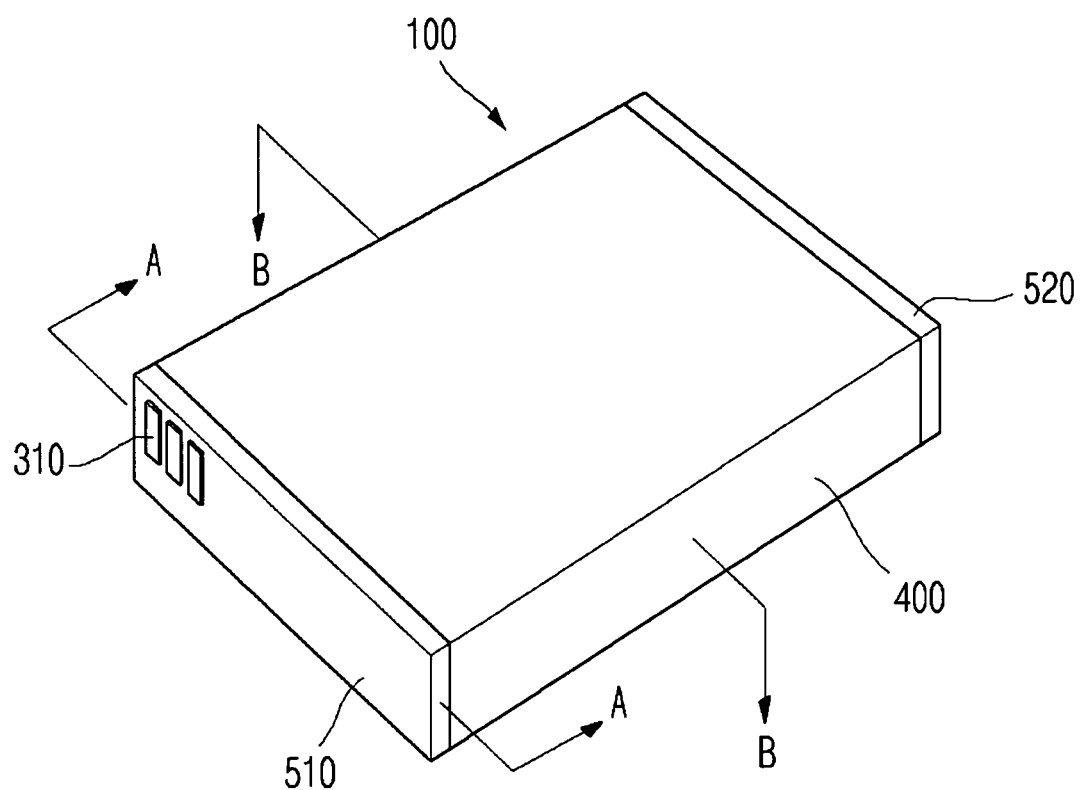
FIG. 1A is a perspective view illustrating a pouch type lithium secondary battery according to an embodiment of the present invention.

Hereinafter, exemplary embodiments of the present invention will be described in detail with reference to accompanying drawings, in which like reference numerals denote like elements.

Figure 1B:
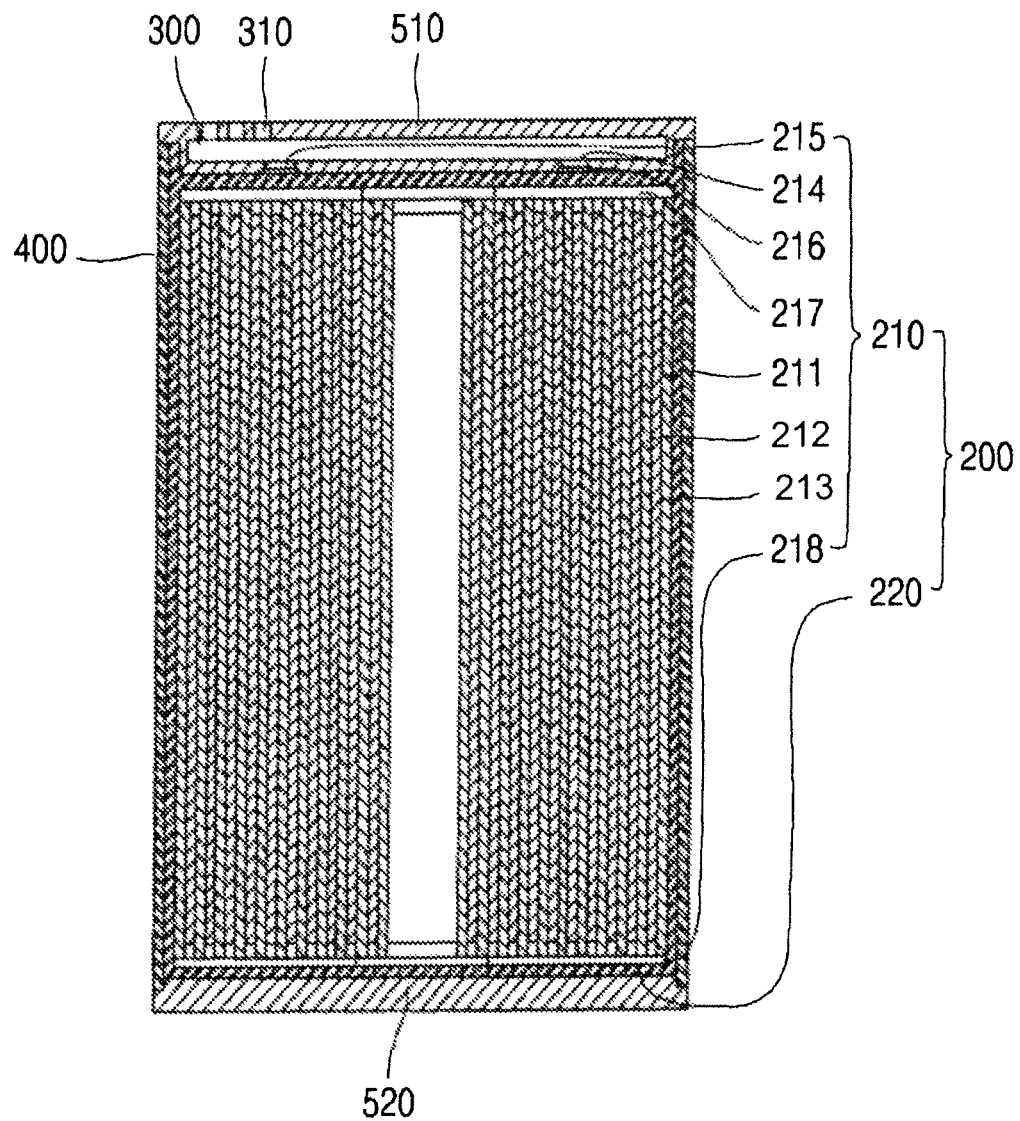
FIG. 1B is a cross-sectional view across a line A-A of FIG. 1A.

FIG. 1A is a perspective view illustrating a pouch type lithium secondary battery according to an embodiment of the present invention; FIG. 1B is a cross-sectional view across a line A-A of FIG. 1A; and FIG. 1C is a cross-sectional view across a line B-B of FIG. 1A.

Figure 1C:
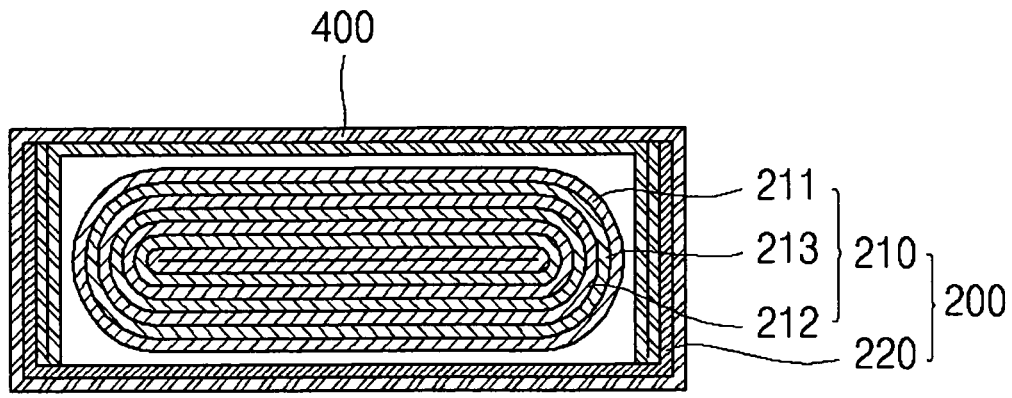
FIG. 1C is a cross-sectional view across a line B-B of FIG. 1A.

Referring to FIGS. 1A through 1C, a pouch type lithium secondary battery 100 according to an embodiment of the present invention includes: a pouch bare cell 200; a protection circuit module 300 for controlling charge/discharge of the pouch bare cell 200; a sleeve member 400 wrapping the pouch bare cell 200; and first and second molding units 510 and 520 formed by a hot-melting method.

The pouch bare cell 200 includes an electrode assembly 210 and a pouch exterior 220 for receiving the electrode assembly 210.

The electrode assembly 210 includes a first electrode plate 211 having a coating made of one of positive and negative active materials; a second electrode plate 212 having a coating made of the other of the positive and negative active materials; and a separator 213 arranged between the first and second electrode plates 211 and 212 to prevent a short circuit between the first and second electrode plates 211 and 212 and allowing only lithium ions to pass through it. In addition, a first electrode tap 214 made of aluminum is bonded to the first electrode plate 211 and protrudes for a predetermined length to function as a positive electrode tap. Similarly, a second electrode tap 215 made of Ni is bonded to the second electrode plate 212 and protrudes for a predetermined length to function as a negative electrode tap. The materials of the first and second electrode taps 214 and 215 according to the present invention are not limited to the aforementioned ones. An insulation tape 216 may be further included for preventing a short circuit between the first and second electrode taps 214 and 215 and the pouch exterior 220. In addition, the first and second electrode taps 214 and 215 extend to the outside of the pouch exterior 220 and are electrically connected to the protection circuit module 300. Furthermore, first and second insulation plates 217 and 218 may be further provided on both ends of the electrode assembly 210 to prevent the electrode assembly 210 from making contact with the pouch exterior 220.

The positive active material may be chalcogenide compounds, e.g., metallic oxide compounds such as $LiCoO_2$, $LiMn_2O_4$, $LiNiO_2$, $LiNi_{1-x}Co_xO_2$ ($0<x<1$), $LiMnO_2$, and the like. The negative active material may be selected from a group consisting of a carbon based material, Si, Sn, tin oxides, composite tin alloys, transition metal oxides, lithium metallic nitrides, or lithium metallic oxides. In one embodiment, the positive electrode plate is made of an aluminum material, and the negative electrode plate is made of a copper material. The separator is usually made of polyethylene or polypropylene. However, the present invention is not limited to the aforementioned materials.

In an embodiment according to the present invention, the first and second electrode taps 214 and 215 of the pouch type lithium secondary battery 100 extend outside of the pouch exterior on a first side.

Figure 3A:
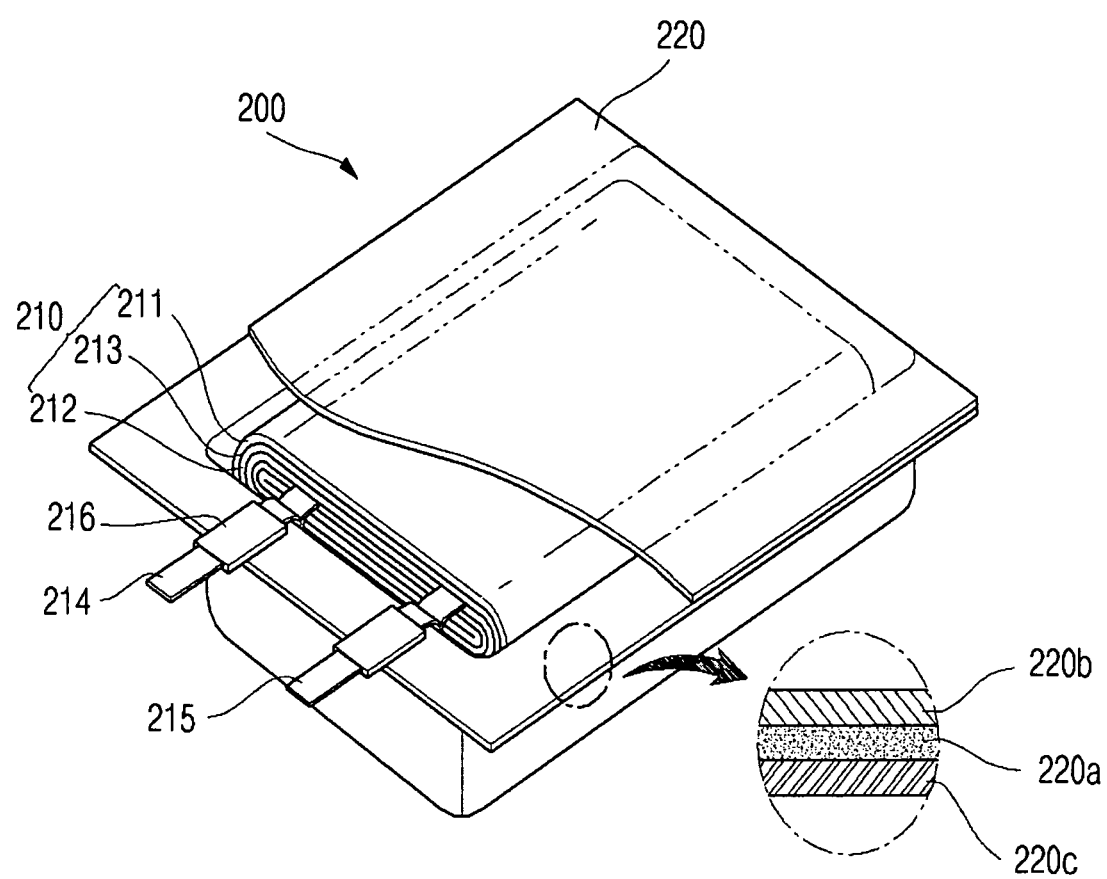
FIGS. 3A through 3D are schematic views for describing a method of fabricating a pouch type lithium secondary battery according to an embodiment of the present invention.
Figure 3B:
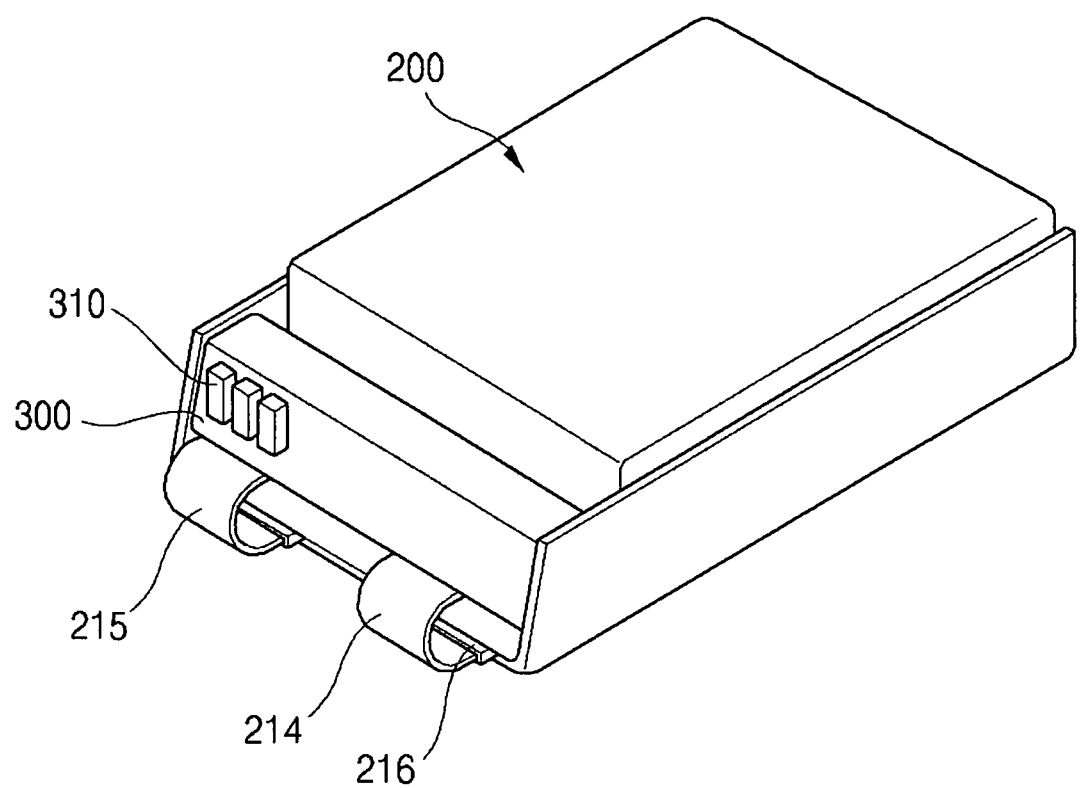
Figure 3C:
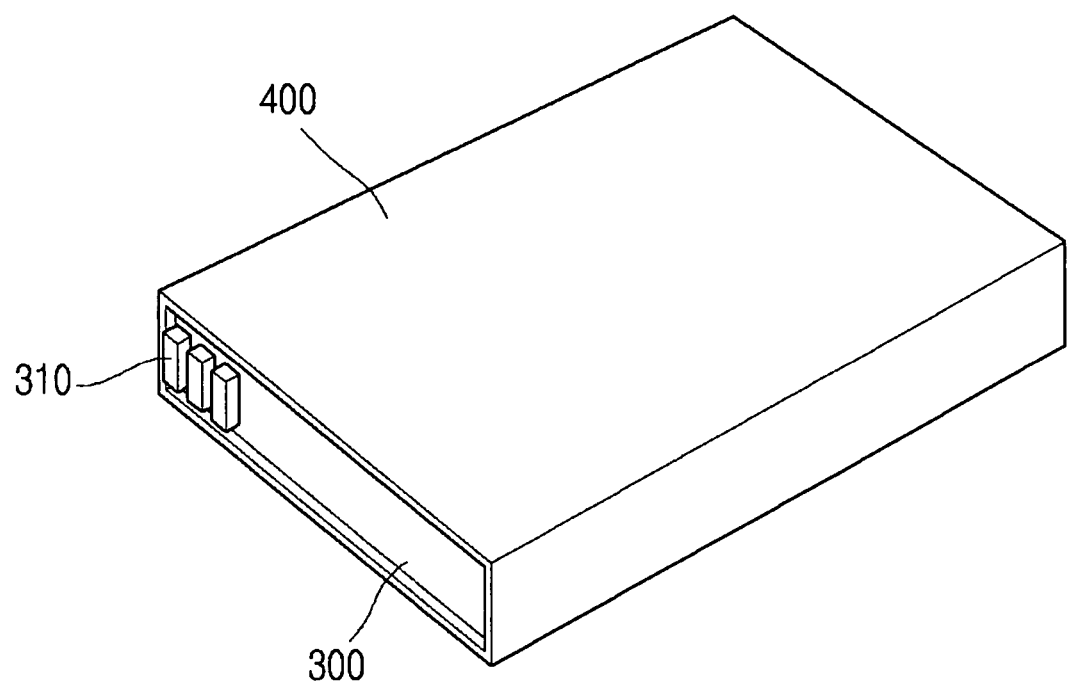
Figure 3D:
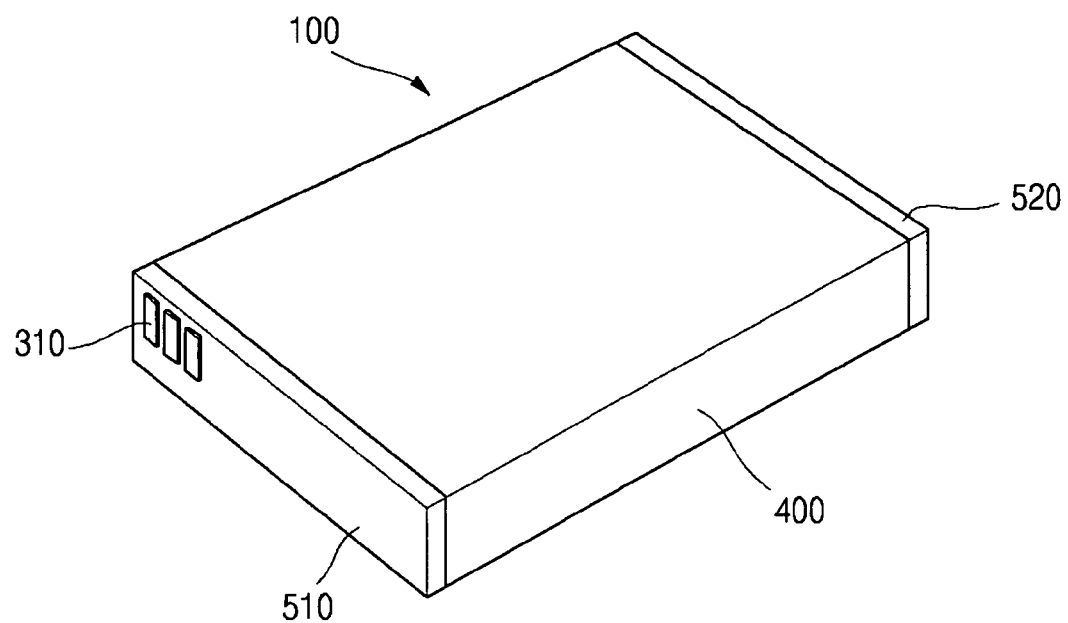

The pouch exterior 220 stores the electrode assembly 210. As shown in FIG. 3A, the pouch exterior 220 has a core layer 220a made of metal such as aluminum, a thermoplastic layer 220b formed on the core layer, and an insulation film 220c formed beneath the core layer. The thermoplastic layer may be made of a polymer resin, e.g., modified polypropylene such as casted polypropylene and functions as a bonding layer. The insulation film may be made of a resin material such as nylon or polyethylene terephthalate (PET). However, the pouch exterior 220 according to the present invention is not limited to the aforementioned configuration and materials.

Referring again to FIGS. 1A-1C, the protection circuit module 300 is arranged on a first end of the pouch bare cell 200 and is electrically connected to the first and second electrode taps 214 and 215 of the electrode assembly 210, so as to control charge/discharge and error operations in the electrode assembly 210. For example, when an excessive current flows from the electrode assembly 200, the protection circuit module 300 cuts off the current. In addition, the protection circuit module 300 has an input/output terminal 310 for charging/discharging the pouch type lithium secondary battery 100 on the protection circuit module 300. Although not shown in the drawing, various protection circuits can be included in the protection circuit module 300.

The sleeve member 400 has a sleeve shape around the pouch bare cell 200. The sleeve member 400 may be not only made to initially have a sleeve shape, but also made by winding a plate- or sheet-shaped member around the pouch bare cell and bonding both ends with an adhesive so as not to become loose. The sleeve member 400, in this embodiment, has a stronger mechanical strength than that of the pouch exterior. In one embodiment, the sleeve member 400 is made of a metallic foil consisting of aluminum, or steel use stainless (SUS).

The first and second molding units 510 and 520 are molded by a hot-melting method. The first and second molding units 510 and 520 allow the sleeve member 400 to consistently have a sleeve shape.

In addition, the hot-melt material used in the first and second molding units 510 and 520 is a thermal-type adhesive. In one embodiment, the hot-melt material is melted at a high temperature and applied to an adherend by using no water or solvent and a nonvolatile nonflammable thermoplastic resin which is 100% solid at an atmospheric temperature. Then, the hot-melt material is pressed, and cooled or solidified in a few seconds so as to have adhesion.

The hot-melt adhesive used in the first and second molding units 510 and 520 may be selected from a group consisting of an ethylene-vinyl acetate copolymer (EVA) based material, a polyamide based material, a polyester based material, a rubber based material, and a polyurethane based material.

In addition, the first molding unit 510 may be formed by molding a first portion of the sleeve member 400 winding around the pouch bare cell 200 by a hot-melting method, and the protection circuit module 300 is assembled thereon. In this case, the input/output terminal 310 of the protection circuit module 300 is exposed on the first molding unit 510.

Similarly, the second molding unit 520 is formed such that the pouch type lithium secondary battery 100 according to the present embodiment winds around the pouch bare cell 200 with the sleeve member 400. The second molding unit 520 is molded by a hot-melting method because the second portion of the pouch type lithium secondary battery 100 is relatively vulnerable to external attacks such as a thrust.

Figure 2:
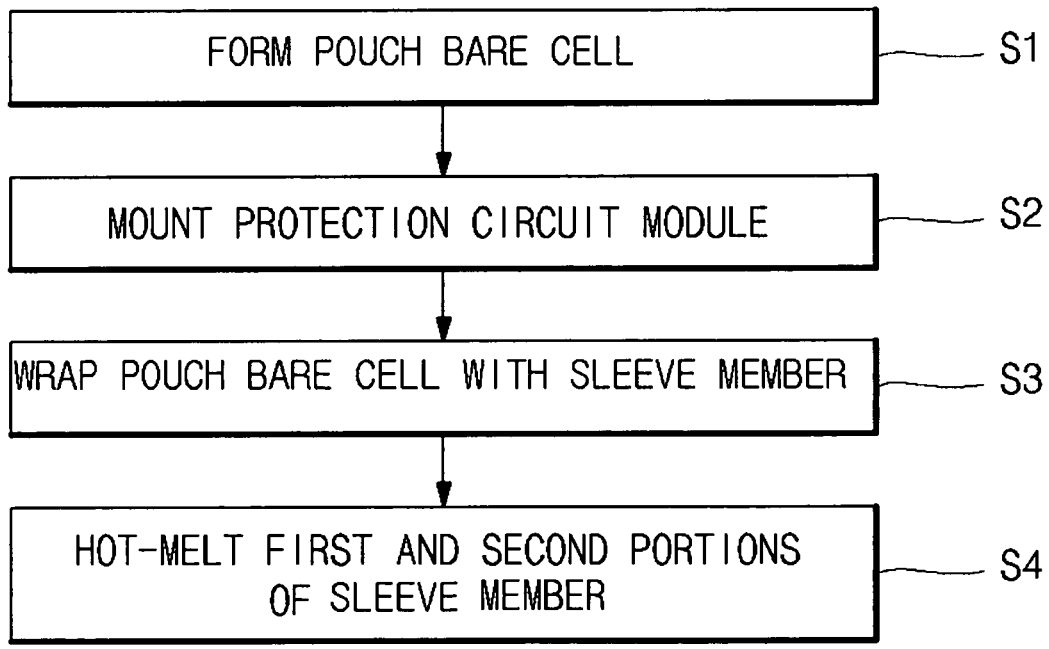
FIG. 2 is a flowchart showing a method of fabricating a pouch type lithium secondary battery according to an embodiment of the present invention.

FIG. 2 is a flow chart for describing a method of fabricating a pouch type lithium secondary battery according to an embodiment of the present invention.

Referring to FIG. 2, a method of fabricating a pouch type lithium secondary battery according to an exemplary embodiment of the present invention includes: S1) forming a pouch bare cell; S2) mounting a protection circuit module; S3) wrapping the pouch bare cell with a sleeve member; and S4) hot-melting first and second molding units to the sleeve member.

FIGS. 3A through 3D are schematic diagrams showing stages in one embodiment of a method of fabricating a pouch type lithium secondary battery with reference to FIG. 2.

First, in a process of forming a pouch bare cell (S1), as shown in FIG. 3A, the electrode assembly 210 is stored in the pouch exterior 220 to provide a pouch bare cell 200.

More specifically, the electrode assembly 210 and the pouch exterior 220 having a space for storing the electrode assembly 210 are prepared.

Then, the electrode assembly 210 is inserted into the space in the pouch exterior 220 for storing the electrode assembly 210. In this case, the first and second electrode taps 214 and 215 of the electrode assembly 210 extend out of the electrode assembly 210 by a predetermined length. It is assumed that the first and second electrode taps 214 and 215 extend in a first direction as is shown in the drawings.

After the electrode assembly 210 is stored, the pouch exterior 220 is sealed through a hot-melting method or the like to provide a pouch bare cell 200.

Although not shown in the drawings, first and second insulation plates may be further attached to first and second portions of the electrode assembly 210 to prevent the electrode assembly 210 from making contact with the pouch exterior 220.

In a process of mounting the protection circuit module (S2), after the pouch bare cell 200 is formed, the protection circuit module 300 is electrically connected to the first and second electrode taps 214 and 215 extending out of the pouch bare cell 200.

In this case, the protection circuit module 300 has various protection circuits to control charge/discharge and error operations in the electrode assembly 210, and includes an input/output terminal 310 for charging/discharging the electrode assembly 210.

In the process of wrapping the pouch bare cell by using the sleeve member (S3), after the protection circuit module 300 is mounted on the pouch bare cell 200, the pouch bare cell 200 is wrapped with a sleeve member 400 into a sleeve shape.

In this embodiment, the sleeve member 400 has a stronger mechanical strength than that of the pouch exterior 220. In one embodiment, the sleeve member 400 is made of a metallic foil such as aluminum or steel-use stainless (SUS).

The sequence of the process of mounting the protection circuit module (S2) and the process of wrapping the pouch bare cell with the sleeve member (S3) are not limited to those described above. Instead, it is possible to perform the process of wrapping the pouch bare cell with the sleeve member (S3) before the process of mounting the protection circuit module (S2).

In the process of hot-melting the first and second portions (S4), after the wrapping process is performed for the pouch bare cell 200 with the sleeve member 400, a hot-melting process is performed for a first portion of the pouch bare cell 200 to which the protection circuit module 300 is mounted and the second portion of the pouch bare cell 200, which is the opposite side of the first portion, to provide first and second molding units 510 and 520, so that a pouch type lithium secondary battery 100 is finally provided.

During one embodiment of the hot-melting process for the first portion, the input/output terminal 310 of the protection circuit module 300 is exposed to outside.

In addition, since the hot-melting process is performed for the first and second portions of the sleeve member 400, it is possible to maintain a sleeve shape of the sleeve member 400 which winds around the pouch bare cell 200.

As described above, a packaging for the pouch lithium secondary battery 100 according to an embodiment of the present invention is performed without a separate package case. Instead, the sleeve member 400 is provided to wind around the pouch bare cell in a sleeve shape. As a result, it is possible to simplify the packaging process.

In addition, since a separate pack case is not used, it is possible to reduce manufacturing cost of the pouch type lithium secondary battery 100.

Figure 4:
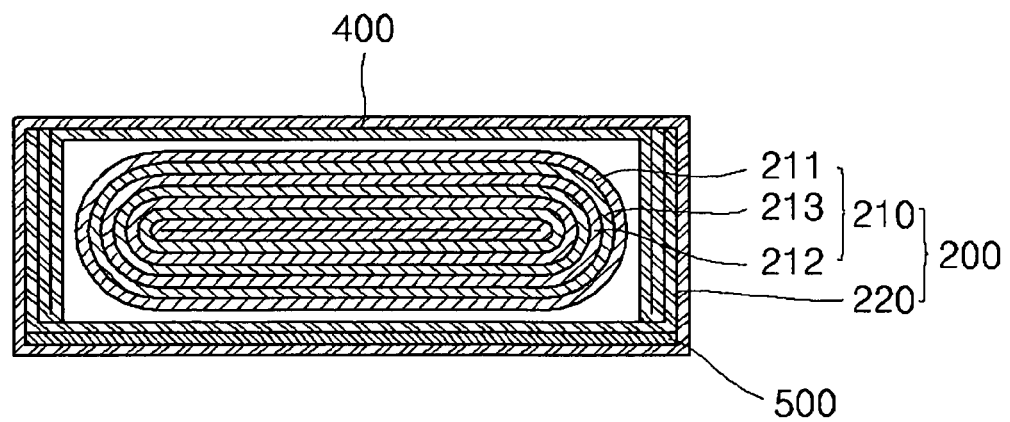
FIG. 4 is a cross-sectional view across a line B-B of FIG. 1 according to another embodiment of the present invention.

FIG. 4 is a cross-sectional view showing another embodiment of the present invention, which shows a cross-section of the pouch type lithium secondary battery having an exterior shape as shown in FIG. 1A when it is cut across a line B-B of FIG. 1A.

Figure 5:
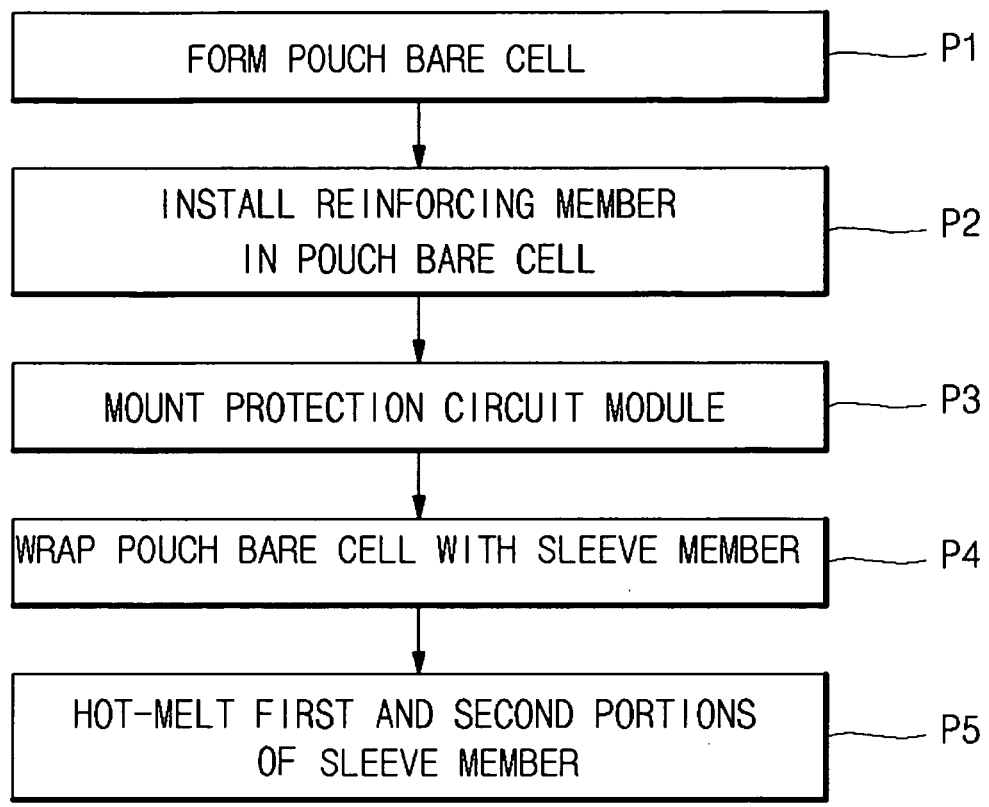
FIG. 5 is a flowchart for describing a method of fabricating a pouch type lithium secondary battery according to another embodiment of the present invention.

FIG. 5 is a flowchart for describing a method of fabricating a pouch type lithium secondary battery according to another embodiment of the present invention.

Referring to FIG. 4, a pouch type lithium secondary battery according to a second embodiment of the present invention has a shape similar to that of the aforementioned embodiment. However, unlike the cross-sectional view of FIG. 1C, a reinforcing member 500 is further provided in an outer surface of the pouch. More specifically, the pouch has a rear plate (i.e., a receiving side) having a hollow provided to store the electrode assembly 210, and a front plate provided to cover the hollow. While the rear plate (an upper one in FIG. 4) is bonded with the front plate (a lower one in FIG. 4) at circumferences, a separate reinforcing member 500 may be attached to the outer surface of the front plate of the pouch. The reinforcing member 500 may be a plate or film made of metal or plastic, and may have an adhesive layer on the surface facing the pouch.

A complete secondary battery having the pouch type bare cell described above may be installed in an electric device in such a way that the side of the reinforcing member 500 faces an outer part of electric device. In this case, even when a destructive force is applied to the electric device, the reinforcing member 500 allows the outer surface to prevent damage to the pouch together with an exterior case of the electric device and the sleeve member 400. As a result, it is possible to improve safety of a pouch type lithium secondary battery.

Referring to FIG. 5, a method of fabricating a pouch type lithium secondary battery according to another embodiment of the present invention further includes a process P2 of installing the reinforcing member 500 between the process P1 of forming the pouch bare cell and the process P3 of mounting the protection circuit module. Then, as shown in FIG. 5, the process P4 of wrapping the pouch bare cell by using the sleeve member and the process of hot-melting the first and second portions P5 are performed to finally provide one embodiment of a lithium secondary battery according to the present invention.

As described above, according to the present invention, it is possible to provide a pouch type lithium secondary battery and a method of fabricating the same having a simplified packing process by using a sleeve member rather than a separate pack case.

While the present invention has been particularly shown and described with reference to exemplary embodiments thereof, it will be understood by those skilled in the art that various changes in form and details may be made therein without departing from the spirit and scope of the invention as defined by the appended claims and their equivalents.

What is claimed is:

1. A method of fabricating a pouch type lithium secondary battery, the method comprising:

forming a pouch bare cell by enclosing an electrode assembly on all sides thereof within each of a core layer, a thermoplastic layer, and an insulation film of a pouch exterior, the pouch bare cell including an electrode tap extending from a first side of the electrode assembly;

attaching a reinforcing member on at least a part of an outer surface of the pouch bare cell after forming the pouch bare cell;

wrapping a sleeve member on the pouch exterior and surrounding a periphery of the pouch bare cell on all sides extending between a first end of the pouch bare cell corresponding to the first side of the electrode assembly and a second end of the pouch bare cell opposite the first end;

forming a first molding unit on a first portion of the sleeve member and facing the first end of the pouch bare cell; and forming a second molding unit on a second portion of the sleeve member and facing the second end of the pouch bare cell, wherein the sleeve member is a metallic foil exposed to an outside of the secondary battery between the first and second molding units and has a mechanical strength greater than that of the pouch exterior, wherein the pouch exterior includes a first plate defining a cavity receiving the electrode assembly therein, and a second plate attached to the first plate and covering the cavity, the reinforcing member being attached to the second plate and covering the cavity, and wherein forming the first molding unit on the first portion of the sleeve member and forming the second molding unit on the second portion of the sleeve member are performed after wrapping the sleeve member, such that the first and second molding units cover outermost sides of the pouch exterior and the sleeve member at the respective first and second ends.

2. The method according to claim 1, further comprising connecting a protection circuit module having an input/output terminal on a first surface of the protection circuit module to the electrode assembly at the first end of the pouch bare cell.

3. The method according to claim 2, wherein the first molding unit is formed by a hot-melt resin, and wherein the first molding unit covers the protection circuit module while exposing the input/output terminal.

4. The method according to claim 1, wherein the second molding unit is formed by a hot-melt resin.

* * * * *